March 4, 1958 P. M. G. TOULON 2,825,754

COLOR TELEVISION RECEIVER

Filed Jan. 14, 1952 9 Sheets-Sheet 1

INVENTOR.
P. M. G. TOULON
BY Moore & Hall
Attorneys

COLOR TELEVISION RECEIVER

INVENTOR.
P. M. G. TOULON
BY Moore & Hall
Attorneys

March 4, 1958 P. M. G. TOULON 2,825,754

COLOR TELEVISION RECEIVER

Filed Jan. 14, 1952 9 Sheets-Sheet 3

INVENTOR.
P. M. G. TOULON
BY Moore & Hall
Attorneys

March 4, 1958 P. M. G. TOULON 2,825,754

COLOR TELEVISION RECEIVER

Filed Jan. 14, 1952 9 Sheets-Sheet 4

INVENTOR.
P.M.G. TOULON
BY Moore & Hall
Attorneys

COLOR TELEVISION RECEIVER

Filed Jan. 14, 1952 9 Sheets-Sheet 5

INVENTOR.
P. M. G. TOULON
BY Moore & Hall
Attorneys

COLOR TELEVISION RECEIVER

INVENTOR.
P. M. G. TOULON
BY Moore & Hall
Attorneys

INVENTOR.
P. M. G. TOULON
BY Moore & Hall
Attorneys

INVENTOR
P. M. G. TOULON
BY Moore & Hall
ATTORNEYS

COLOR TELEVISION RECEIVER

Filed Jan. 14, 1952 9 Sheets-Sheet 9

INVENTOR
P.M.G. TOULON

BY Moore & Hall

ATTORNEYS 2,825,754
Patented Mar. 4, 1958

2,825,754

COLOR TELEVISION RECEIVER

Pierre Marie Gabriel Toulon, New York, N. Y., assignor, by mesne assignments, to Moore and Hall, Washington, D. C., a partnership Application January 14, 1952, Serial No. 266,317

3 Claims. (Cl. 178—5.4)

This invention relates to a method of and apparatus for color television, and to a wave generator suited for use in my color television system.

One object of the invention is to provide an improved compatible color television system, and another object is to provide a color television system with improved picture quality.

Still another object is to provide a wave generator particularly suited for use as a scanning voltage generator in my new television system.

This invention provides a new television system, a new wave generator particularly suited as a deflection voltage generator.

The new television system employs at the receiver three saw tooth waves of the same repetition rate and phase-shifted 120 degrees from each other. Relay means switch these three waves in succession to the vertical deflection plates at the dot frequency, so that incremental spots appear almost simultaneously along three horizontal lines respectively spaced at the top, one-third the way down and two-thirds the way down the screen. Color filtering means impart the three primary colors to the three horizontal lines respectively.

Due to the high frequency of the potentials applied to the vertical deflection plates, the leads are shielded and the potential applied to the shield is of the same frequency, potential and phase as that applied to the lead enclosed by the shield.

The wave generator comprises a ring of resistance material having a sector of insulating material. Direct current potential is applied across the ring of insulating material. Three brushes equally spaced around the ring pick off saw tooth waves. A special relay system is used for selecting the saw tooth waves and applying them sequentially at a very high rate to the deflection plates of the cathode ray tube.

In connection with illustrative Figures 7, 8, 12 and 13 it is understood that there will normally be a great number of dots in a horizontal line whereas for the sake of simplicity only a few are shown.

Figures 14, 16, 17:
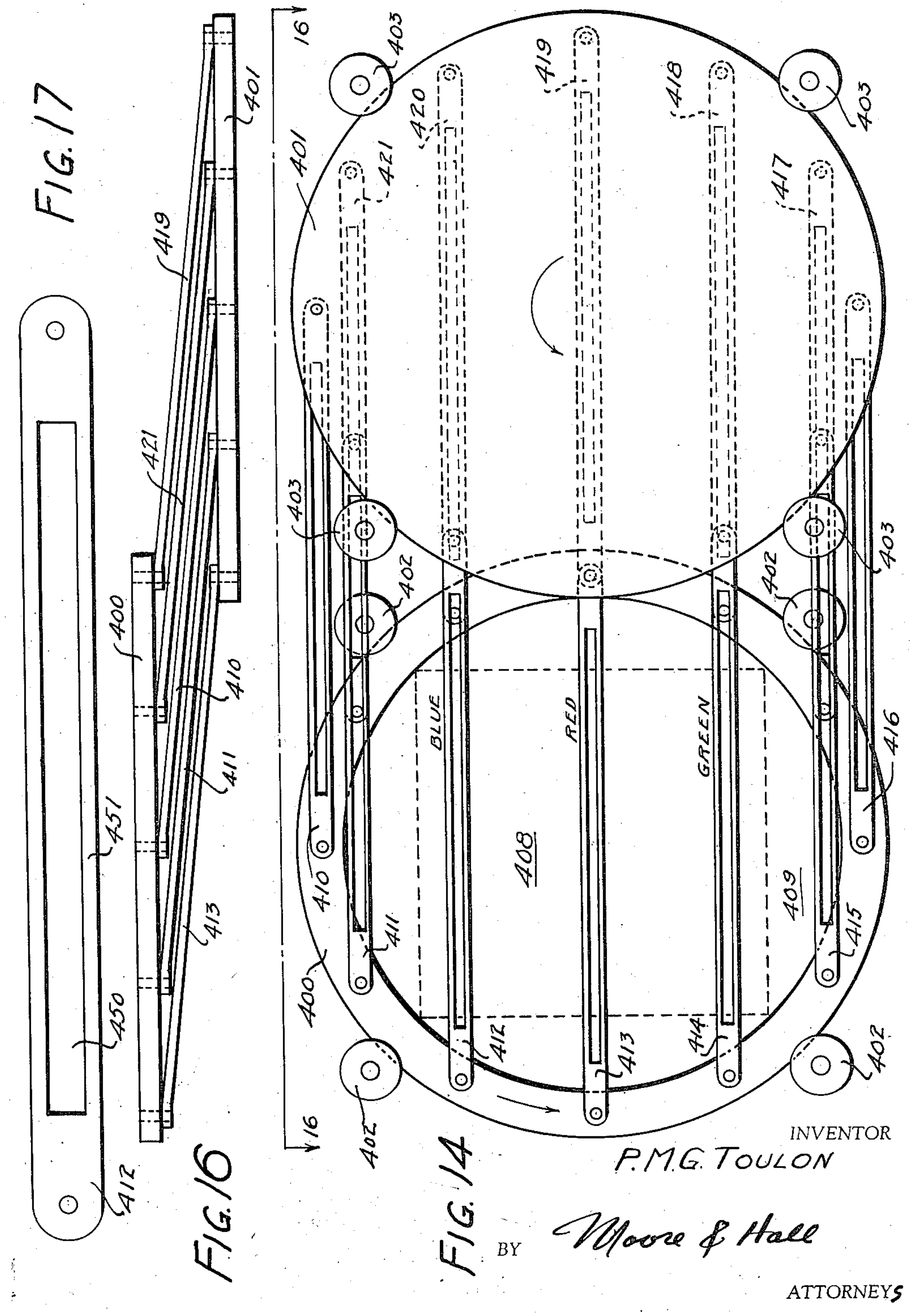

Figure 14 is a front view of a modified form of color screen system suitable for use with this invention.

Figure 15:
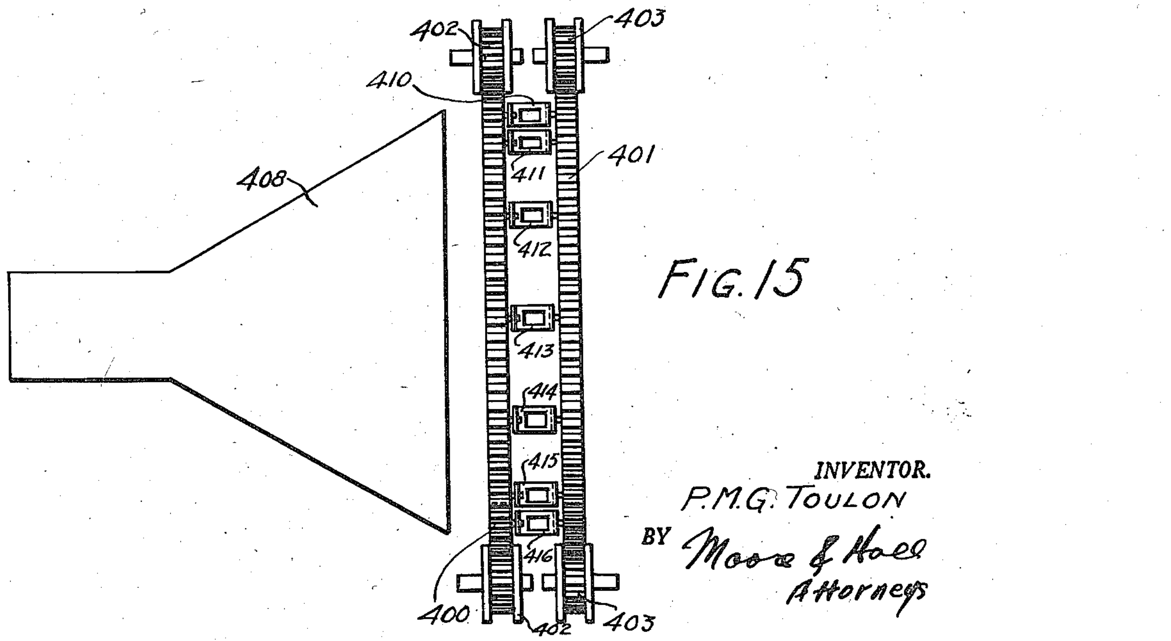

Figure 15 is a side view of the color screen system of Figure 14, and

Figure 16 is a top view of the color screen system of Figure 14.

Figure 17 illustrates a front view of one of the light filter links of Figure 14.

Figure 1:
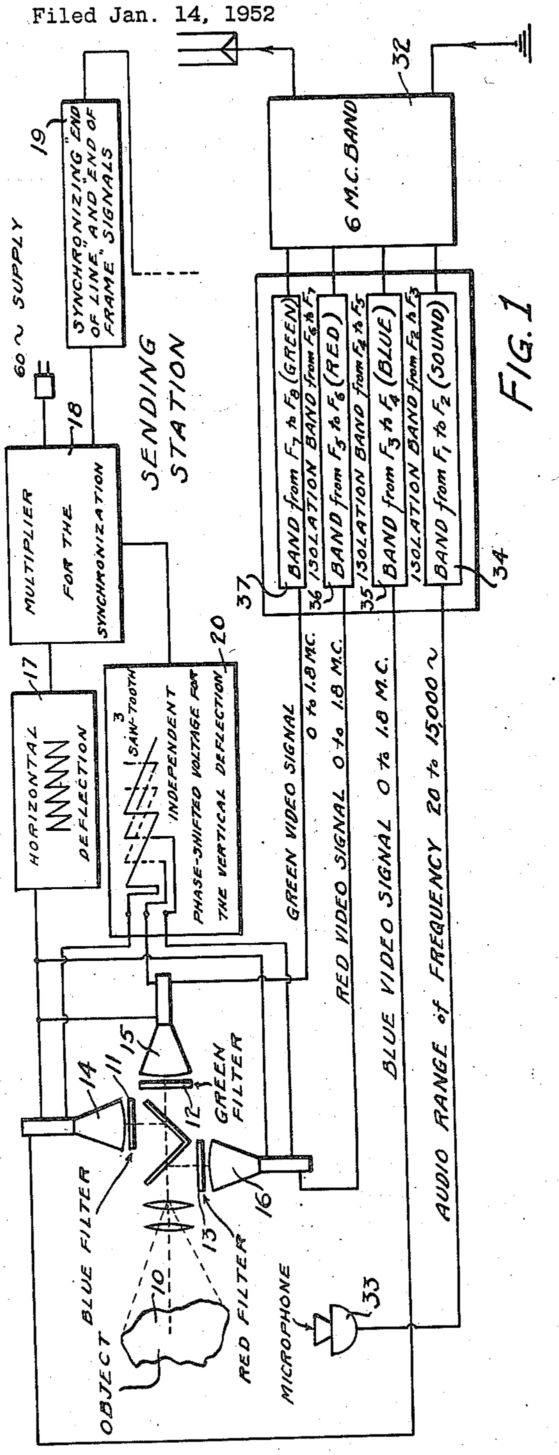
Figure 1 is a block diagram of a transmitter suitable for transmitting color television signals.
Figure 5:
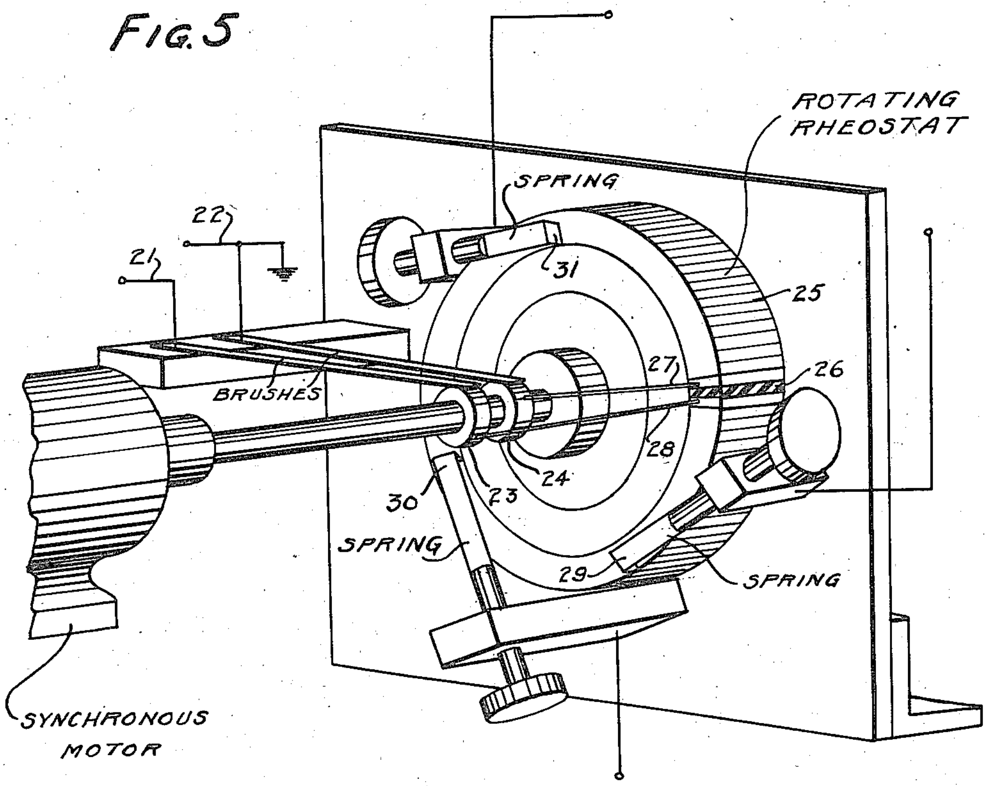
Figure 5 is an elevation view of a rotating rheostat which is one component part of the receiving station.

Referring to Figure 1 the "object" 10 is projected through three filters 11, 12, 13 which are respectively blue, green, and red, to kinetoscopes 14, 15 and 16. The horizontal deflection of this tube is controlled by the saw tooth wave generator 17, which is in turn controlled by frequency multiplier 18 which is in turn energized by the conventional sixty cycle power line. Multiplier 18 controls conventional generator 19 for producing "end of line" and "end of frame" signals. The horizontal deflection of these tubes are controlled by the saw tooth wave generator 17, which is in turn controlled by frequency multiplier 18 which is in turn energized by the conventional sixty cycle power line. Multiplier 18 controls conventional generator 19 for producing "end of line" and "end of frame" signals. The vertical deflection elements of kinetoscopes 14, 15 and 16 are controlled by three saw-tooth waves displaced in phase by 120 degrees from each other. Suitable means for producing these three saw tooth waves are shown broadly in block 20, and may take the form specifically shown in Figure 5. In Figure 5, the synchronous motor rotates at frame frequency (when interlaced scanning is employed the motor makes one revolution during the scanning of the odd lines and one revolution during the scanning of the even lines). Direct current having a potential equal to the maximum height of the saw tooth wave form is fed across input wires 21 and 22 and is in turn fed to slip rings 23 and 24.

The rotating ring 25 of resistance material has a gap 26 of insulating material and the slip rings are respectively connected to ring 25 adjacent opposite sides of gap 26 by wires 27 and 28. Three stationary brushes 29, 30 and 31 are displaced 120 degrees apart around the ring 25. Since input lead 22 is grounded, the potential on each brush 29, 30 and 31 will have a saw tooth wave form and saw tooth on any one brush will be 120 degrees apart from those on the other two brushes. The three brushes 29, 30 and 31 are respectively connected to the vertical deflecting plates of television cameras 14, 15 and 16.

The radio transmitter 32 is modulated at frequencies between F–1 and F–2 which may be 20 to 15,000 cycles per second by microphone 33. This signal is limited in band width by band-pass filter 34. The "blue" video modulation of 0 to 1.8 mc. is by suitable heterodyning and band pass filtering converted to frequency band F–3 to F–4 at 35 and applied to modulate transmitter 32. Similarly the "red" video signal of 0 to 1.8 mc. is raised to frequencies F–5 to F–6 by suitable heterodyning and band pass filtering at 36, and then used to modulate transmitter 32. Likewise the "green" video signal of 0 to 1.8 mc. is raised to frequency band F–7 to F–8 at 37, and used to modulate transmitter 32.

Figure 2:
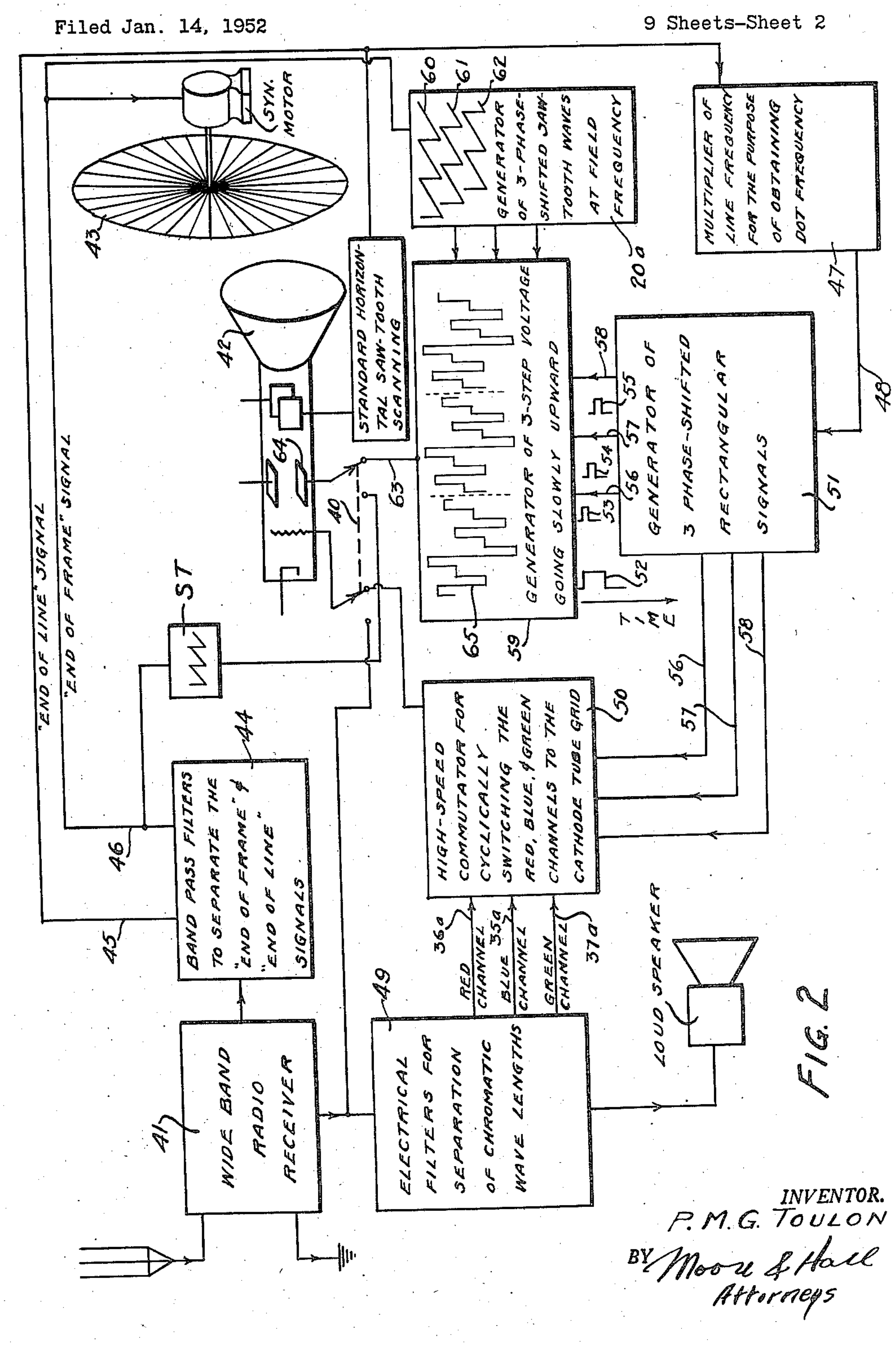
Figure 2 is a block diagram of the receiving station.

Figure 2 is a block diagram of the novel receiver, it being explained in greater detail in connection with Figures 3 to 6. The receiver is "compatible" in that it can receive conventional "black and white" pictures of the type currently in general use in the United States, and it can also receive color pictures. To receive "black and white" the two pole double throw switch 40 is thrown to the left in which event the output of receiver 41 is fed to the grid of the cathode ray tube 42, and the conventional saw tooth generator ST of vertical deflection potentials is fed to the vertical deflection plates 64 of cathode ray tube 42. If the scanning disc is then omitted the device will operate in all respects as a conventional black and white receiver, the parts peculiar to color reception being disconnected.

When switch 40 is thrown to the right and the scanning disc 43 is moved into position the apparatus will act as a color television receiver as follows. The output of receiver 41 feeds band pass filter block 44 to produce end of line signals in lead 45 and end of frame signals in lead 46 all in the well known way. Conventional multiplier 47 multiplies the frequency of the end of line signals in lead 45 by the number of dots in a line and hence its output on lead 48 is at the dot frequency of the television signals. The video signals from receiver 41 are fed through channel 49 which separates the signals into blue, red and green channels 35*a*, 36*a* and 37*a* that respectively correspond in frequency and amplitude to the complementary signal outputs of channels 35, 36 and 37 of Figure 1.

Block 20*a* represents a generator identical with generator 20 of Figure 1, and hence may be as shown and described in connection with Figure 5. Generator 51 receives dot pulses from lead 48 and converts them into three dots for each one received. Assuming that signal 52 represents a dot received from wire 48, the signal is broken down into three dots 53, 54 and 55 which occur in time sequence and are respectively fed over leads 56, 57 and 58 to generator 59, which also receives signals from generator 20*a*. Briefly speaking generator 59 may consist of electronic relays arranged so that when there is a signal on wire 56 the saw tooth wave 60 (and it alone) is fed over wire 63 to the vertical deflection plates 64 of cathode ray tube 42. Likewise when there is a signal on wire 57, saw tooth wave 61 is fed to the vertical deflection plates 64. When there is a signal on wire 58 the saw tooth wave 62 is fed to the vertical deflection plates 64. Hence, the output wave of generator 59 is as illustrated at 65.

Commutator system 50 is also an electronic relay system. Whenever there is a signal on wire 56 the "blue" signal on wire 35*a* is fed to the cathode ray tube grid. Whenever there is a signal on wire 57 the "red" signal on wire 36*a* is fed to said grid, and whenever there is a signal on wire 58 the "green" signal on wire 37*a* is fed to said grid.

In view of the foregoing we see that upon arrival of the "blue" intelligence on channel 35*a*, the dot 53 on line 56 switches saw tooth wave 60 onto vertical plates 64. This saw tooth wave 60 being at its peak value will place "blue" dot 66 in the upper left corner of the cathode ray screen (see Figure 7). One third of a dot later, signal 54 connects saw tooth wave 61 to vertical deflection plates 64. Wave 61 being 120 degrees away from wave 60, it will cause the cathode ray beam to shift to spot 67 and at the same time commutator 50 will shift red channel 36*a* to the cathode ray tube grid. Thus the impulse at spot 67 will represent the red signal. Likewise one-third of a dot later the signal on wire 58 will connect saw tooth 62 to plates 64 and thus position the spot at 68 while commutator 50 shifts the signal on "green" channel 37*a* to the grid of the cathode ray tube 42. Hence, the order of representation is 66, 67, 68, 69, 70, 71, 72, 73, 74, 75. 76 and 77. It is understood that the dot frequency on line 48 is much faster than the saw tooth frequency 60, 61, 62, so that the potentials of saw tooth waves 60, 61 and 62 changed very little indeed during the entire period of establishments of all of the spots 66 to 77 inclusive. However, the saw tooth waves do of course change so that that spot 75 is at a lower level than spot 66, and when the horizontal scanning returns the beam to the left hand column the spot 78 will appear below spot 66 and from then on a new spot will appear immediately below each of spots 66 to 77 inclusive, this process repeating itself until later on areas of the screen have been scanned as shown in Figure 8. When the circumstance of Figure 8 is achieved the "blue" saw tooth wave 60 has descended one-third of its way from its peak toward zero potential.

Figure 7:
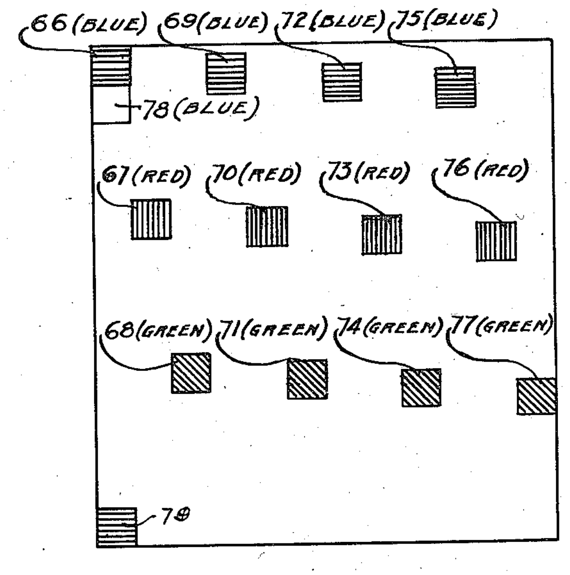
Figure 7 illustrates the face of the cathode ray tube at the receiver.
Figure 8:
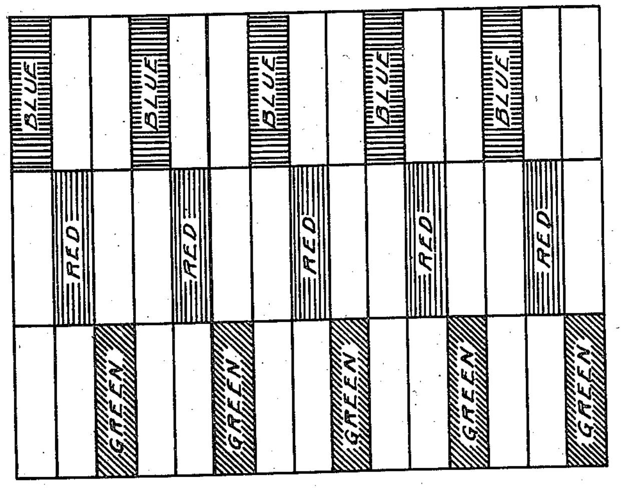
Figure 8 illustrates those areas of the screen that have been scanned after one-third of a cycle of the saw tooth wave generator.
Figure 9:
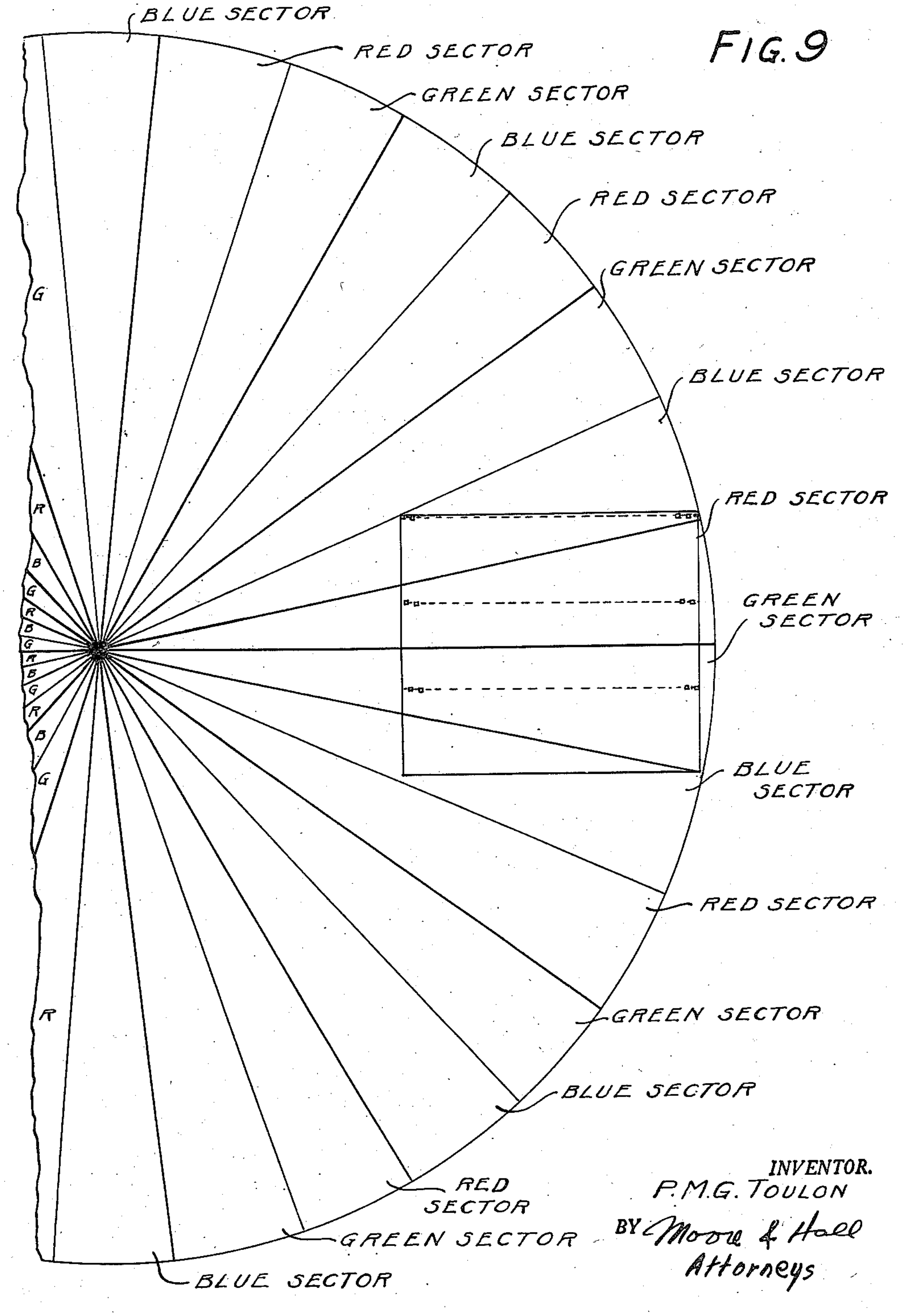
Figure 9 illustrates the relative position of the cathode ray tube and the rotating color wheel.
Figure 12:
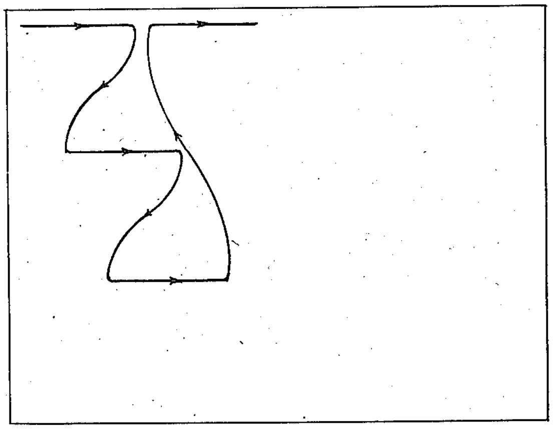
Figures 12 and 13 illustrate certain new scanning paths that may be employed with my present invention.

It is at this point convenient to interrupt the discussion of the scanning process to examine the action of the color wheel 43 during the interval of time represented by Figure 8. Color wheel 43 has a suitable number of color bands, preferably thirty. The color wheel 43 rotates at such a speed that the spot on the wheel that covers spot 66 moves downward at such a rate that said spot of the wheel covers spot 78 when the latter is illuminated. Figure 9 illustrates how the color wheel 43 covers the several spots of Figure 7. It clearly appears that the blue sector of the wheel 43 covers the "blue" spots 66, 69, 72 and 75, while the red sector of the wheel covers the "red" spots 67, 70, 73 and 76, while the green sector of the wheel covers the "green" spots 68, 71, 74 and 77. Further as the several spots 66 to 77 inclusive are replaced by spots that appear lower and lower the color wheel advances accordingly and in step therewith, until when the condition of Figure 8 is realized the color wheel 43 will have advanced exactly one sector thereof.

As the potential of saw tooth wave 60 decreases toward zero more "blue" spots appear in the first vertical column until finally a "blue" spot appears at point 79 at which time the blue sector of color wheel 43 has moved downward and is covering the lowermost horizontal row of dots of the screen.

During the time required for the vertical scanning to move from spot 66 to spot 69 of Figure 7, the saw-tooth wave 61 has moved the red spots along a horizontal path starting at 67 and down to the bottom of the screen and then from the top of the screen downward toward the original position of spot 67. Likewise during the same interval green spot 68 covered a vertical path extending to the bottom of the screen and then shifting to the top and following a vertical path downward practically to its present position.

Summarizing the establishment of the spots and the way they are scanned it can be said that the "blue" spots are established in horizontal rows that are spaced about one-third the height of the screen from the "red" dots which are in turn spaced about one-third the height of the screen from the "green" spots. The "blue" spots appear in the first vertical column, the "red" spots in the second vertical column, and the "green" spots in a third vertical column. The blue sector of the color wheel covers the horizontal row of blue spots and follows this horizontal row as it slowly descends down the face of the screen. The red sector follows the row of "red" spots and the green sector follows the row of "green" spots.

Figure 3:
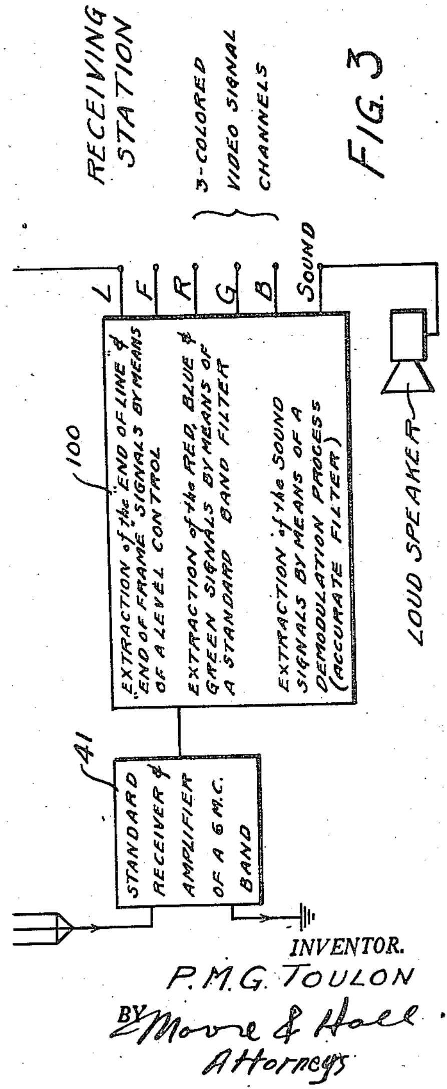
Figure 3 is a block diagram of a conventional portion of the receiving station.
Figure 4:
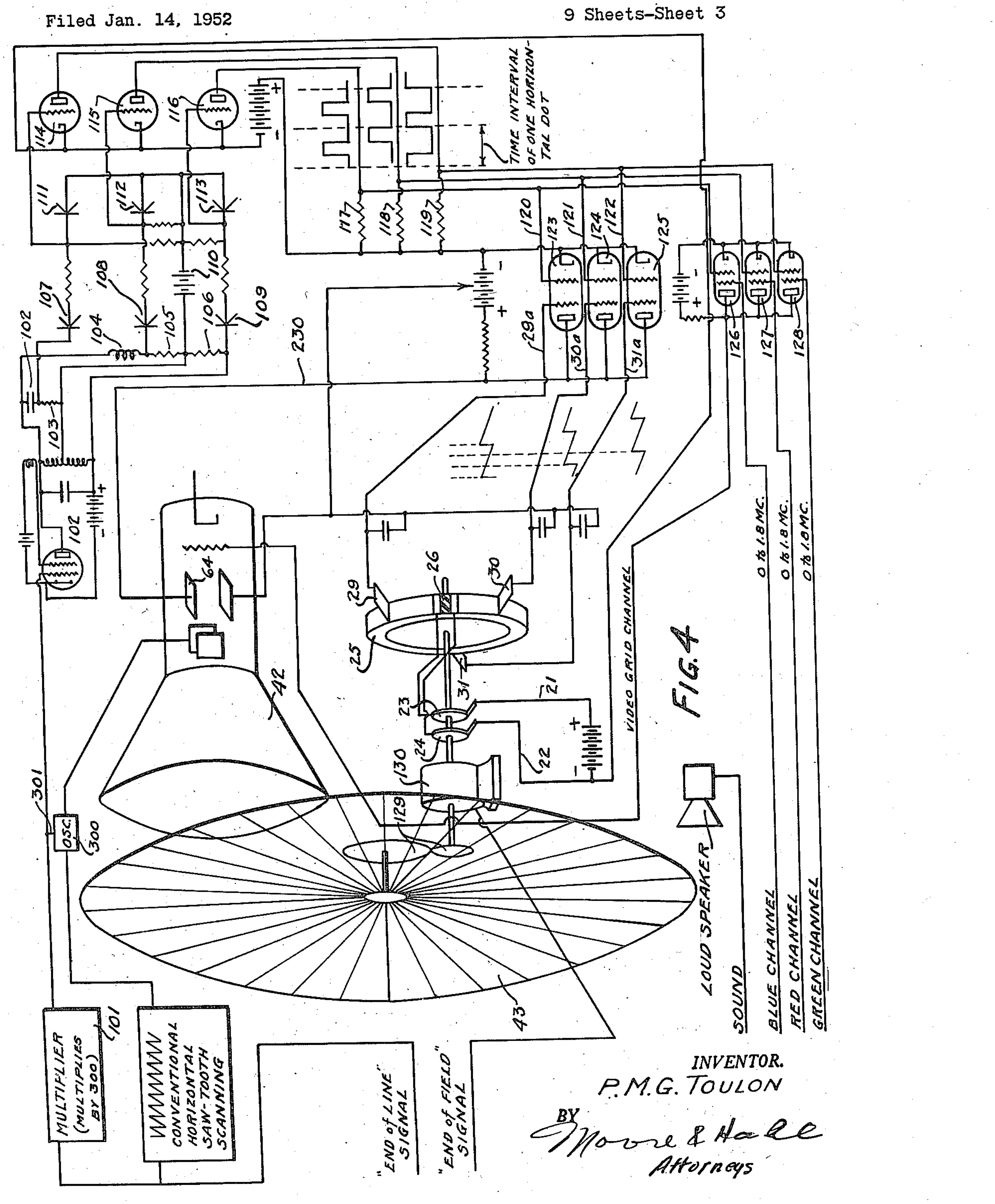
Figure 4 is a schematic diagram of a simplified form of the receiving station.

The simplified form of the invention as shown in Figures 3 and 4 will now be described in some detail. The receiver 41 feeds heterodyne and filter block 100 which has output leads as follows: end of line channel L, end of frame channel F, red channel R (36*a* of Figure 2), green channel G (37*a* of Figure 2), blue channel B (35*a* of Figure 2), and sound channel S. The apparatus of Figure 3 is hence quite conventional. It feeds the system of Figure 4.

In Figure 4 end of line signals feed multiplier 101 which multiplies the frequency of the signal by the number of dots in a line, which may in a typical case be 300. The output of multiplier 101 is fed to an oscillator 102 which is triggered to oscillate at the frequency of the output of the multiplier 101. The output of the oscillator 102 has a phase splitting arrangement for converting the single phase output into a three phase one. This splitter follows known principles and employs a condenser 102 in series with a resistor 103 for producing a 120 degree leading current, an inductor 104 in series with a resistor 105 for producing a lagging current, and a resistor 106 for producing a third current. The outputs of each of the three phases are rectified by rectifiers 107, 108 and 109 respectively thus producing half wave impulses, the impulses leaving the rectifier 107 being displaced in phase by 120 degrees from the impulses leaving rectifiers 108 and 109. In order to give the half-wave impulses square wave forms, three limiters are employed. The three limiters have a common battery 110, so that whenever the potential output of any of rectifiers 107, 108 and 109 rises above the potential of battery 110, the excess potential will be shorted by one of limiter rectifiers 111, 112 and 113 to the neutral wire 114. The outputs of rectifiers 107, 108 and 109 are respectively fed to amplifiers 114, 115 and 116, and the amplified signals are fed along output wires 117, 118 and 119. It clearly appears that these wires have a series of square wave impulses each impulse being one-third of a dot in length, the impulses in the three wires being phase displaced by 120 degrees.

While the parts 101 to 116 have been described in some detail it should be mentioned that the principles embodied therein are fully disclosed in my prior U. S. Patent 2,568,375, and in my prior copending applications Serial No. 166,013, filed June 3, 1950, entitled Compressed Television (see Figures 4 and 6), and Serial No. 163,285, filed May 20, 1950, entitled Color Television (Figure 9).

The signals on wires 117, 118 and 119 are respectively fed to the first grids 120, 121, and 122 of tubes 123, 124 and 125. The second grids of these tubes are respectively controlled by the three saw tooth waves produced by the device of Figure 5, being fed to the second grids by wires **29*a*, 30*a* and 31*a* which are respectively fed by brushes 29, 30 and 31. The three tubes 123, 124 and 125 are normally non-conducting and can become conducting only when the first grid of the tube is energized. Hence when there is a signal on wire 117 the tube 123 becomes conducting and applies the potential of wire 31*a* to the second grid of tube 123 and hence controls the vertical deflection plates of the cathode ray tube. Likewise tubes 124 and 125 apply the signals on wires 29*a* and 30*a*** to the vertical deflection plates when their respective first grids are energized.

The signals on wires 117, 118 and 119 respectively control the control grids of tubes 126, 127 and 128. These three tubes are normally non-conducting and tube 126 becomes conducting only when a signal from wire 117 is impressed on the tube 126. Likewise tubes 127 and 128 must be energized by signals from wires 118 or 119 in order to become conducting. Thus when a signal exists on wire 117, the signal on "blue" channel B is fed through tube 126 to the grid of the cathode ray tube. Likewise when a signal exists on wire 118, the signal on "red" channel R is fed through tube 127 to the grid of the cathode ray tube. Moreover, when a signal exists on wire 119, the signal on "green" channel G is fed to the cathode ray tube.

The horizontal scanning for the cathode ray tube is according to conventional practice as shown in the drawing.

While other numbers can be used, the color wheel 43 may have thirty sectors (ten blue, ten red and ten green). In that case it should rotate at one-tenth the speed of resistor wheel 25, hence step down gearing 129 is employed between the synchronous motor 130 and color wheel 43.

From an analysis of Figure 4 it is obvious that wire 117 jointly triggers tubes 123 and 126. Hence, when there is a signal on wire 117, the tube 123 applies the proper saw tooth wave (from brush 31) to the vertical deflection plates to position the spot in a proper vertical position behind a blue sector of the color wheel 43. At the same time tube 126 admits the "blue" signal to the grid of the cathode ray tube 42. Likewise wire 118 jointly controls tubes 124 and 127, and wire 119 jointly controls tubes 125 and 128.

Figure 6:
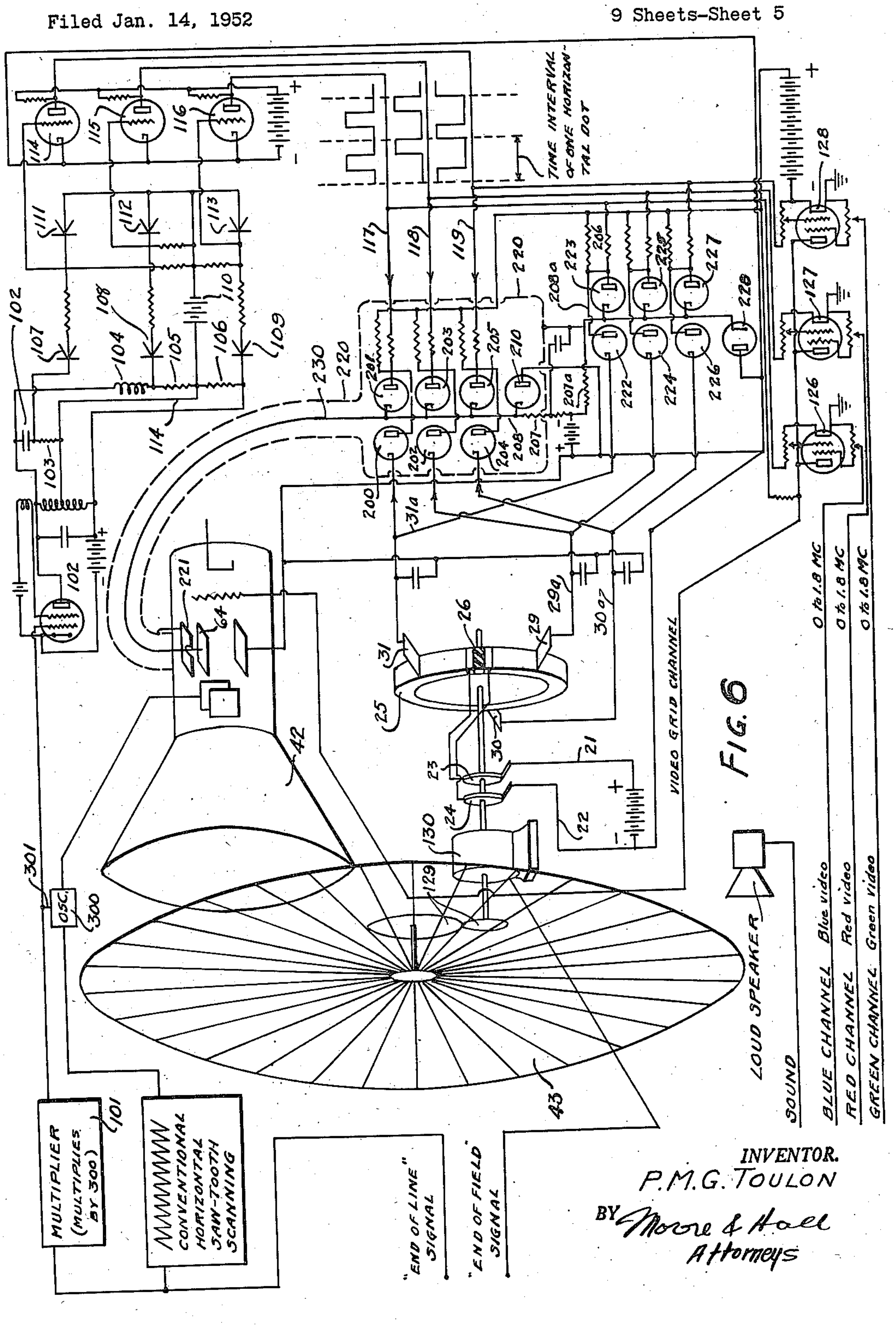
Figure 6 is a schematic diagram of the preferred form of the invention. This form of the invention is more complicated than the form of Figure 4 and produces better results.

In the preferred form of the invention shown in Figure 6 the parts are all identical in construction and mode of operation as the complementary parts of Figure 4 except that tubes 123, 124 and 125 have been replaced by the several parts of Figure 6 having reference numbers of 200 and higher. Due to the connections tubes 200 and 201 of Figure 6 are broadly the equivalent of tube 123 of Figure 4 although the system of Figure 6 is an improvement in that the tube 123 of Figure 4 lacks the linearity of Figure 6. Linearity can be improved in Figure 6 if the diodes are replaced by germanium rectifiers.

Figure 10:
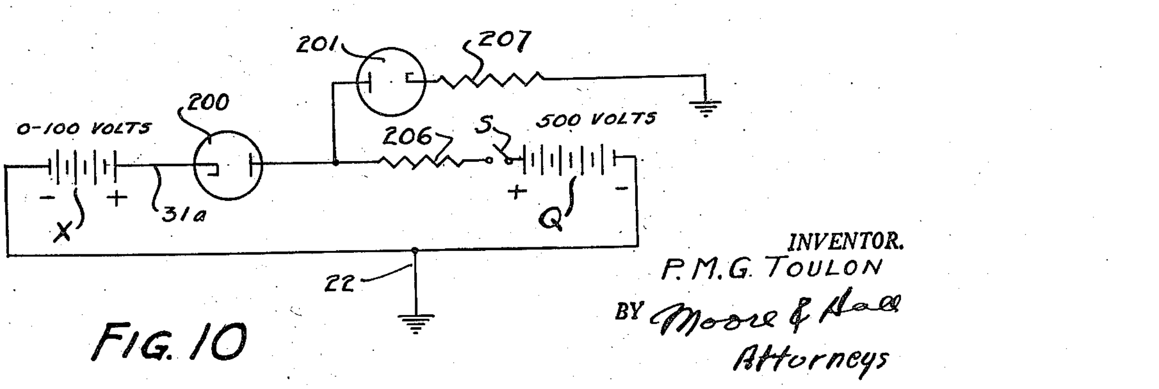
Figures 10 and 11 are simplified circuits used in explaining certain features of my system.

In Figure 10 some of the parts of Figure 6 have been illustrated in a more simplified form in order to illustrate the operation. Assume battery X to represent the saw tooth wave generator having output lead **31*a* on which the potential varies from 0 to 100 volts relative to ground 22. Assume the potential on wire 117 of Figure 6 to be represented in Figure 10 by a battery Q of 500 volts which may be turned on and off by switch S. It is evident that when switch S is open there is no potential across output resistor 207. Hence, in Figure 6 there is no potential across the output resistor 207, as a result of the action of diodes 200 and 201 except when there is a potential on wire 117. Referring again to Figure 10 it is evident that when switch S is closed, the potential across resistor 207 will vary precisely according to variations in the voltage of source X, disregarding any drops in potential in the diodes themselves. In this situation the battery Q will send a flow of current through resistor 206, diode 200, and source X. The potential across resistor 206 must equal $Q-X$, hence the potential across resistor 207 must equal that of source X. Therefore, in Figure 6 the potential on the cathode of diode 201 is equal to the potential on wire 31*a* as long as there is a signal on wire 117 that far exceeds the potential on wire 31*a*. In manner similar to the above diodes 202 and 203 will apply the potential of wire 29*a* to resistor 207 when there is a potential on wire 118. Similarly diodes 204 and 205 will apply the potential of wire 30*a* to resistor 207 when there is a potential on wire 119**.

Potentials exist simultaneously on wires **29*a*, 30*a* and 31*a* yet only one of these potentials is fed to wire 230 at any one instant. It is desirable to provide means for preventing the two potentials that are not in use from affecting the one being used. Hence, rectifiers 201, 203 and 205 are employed. To illustrate this action, assume that the potential on wire 117 is causing a current flow in rectifier 201. No signals are at that instant on wires 118 and 119. Hence, no currents can flow in wires 29*a* and 30*a* through rectifiers 203 and 205 since these rectifiers have their anodes connected to the positive side of the saw tooth potentials (on wires 29*a* and 30*a*). Therefore the potentials on wires 29*a* and 30*a* cannot affect the potential on wire 208**.

It is understood that if the potentials of X and Q of Figure 10 are reversed that the anode and cathode connections of tubes 200 and 201 should also be reversed. Hence, an arrangement fully equivalent to that shown may be employed if the anode and cathode connections of the several rectifiers are all reversed and the battery polarities reversed.

Figures 11, 13:
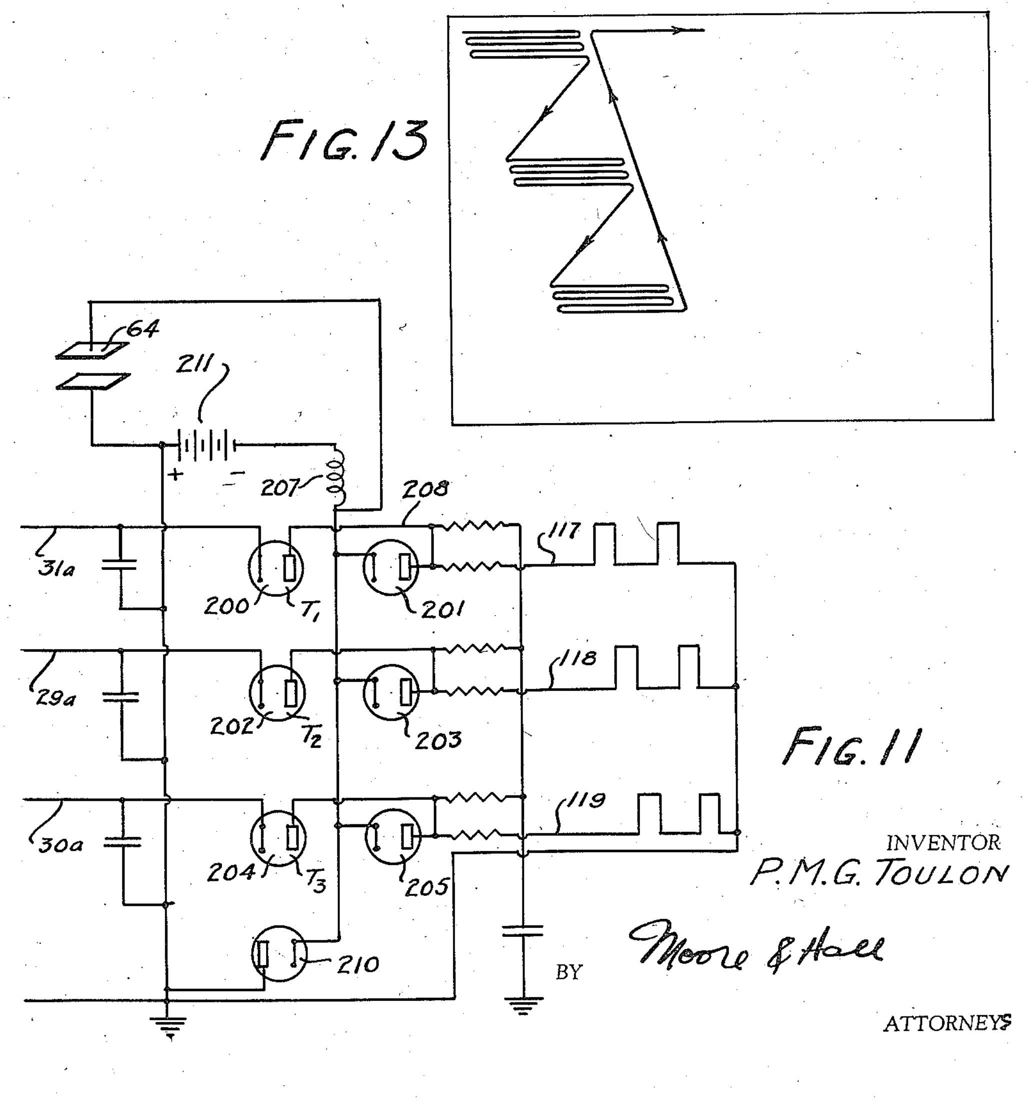

Figure 11 illustrates the principle of rectifier 210 which also is preferably a germanium rectifier. Since the anode of rectifier 210 is grounded the rectifier 210 at all times prevents the cathode of rectifier 210 (and the right hand end of resistor 207) from becoming negative. In the absence of rectifier 210 the battery 211 could drive the right-hand end of resistor 207 negatively. By employing battery 211 the various potentials of the saw tooth wave generator 29, 30, 31 and of the phase splitter output 117, 118, 119 may be made higher than otherwise so as to improve the linearity of the several rectifiers. In Figure 11, it is assumed that the shield 220, the auxiliary plate 221, and the rectifiers 222 to 228, have been omitted. If these parts are added the error resulting from the capacity between wire 230 and ground is reduced. Rectifiers 222 to 228 are similar both in construction and in their relative interconnections with rectifiers 200 to 210. Resistor 207*a* is similar to resistor 207. The output of rectifiers 222 to 228 is fed on wire 208*a* to the shield 220, which is therefore charged to about the potential as wire 230. Hence, there cannot be appreciable potential loss from wire 230, or deflection plate 64, due to capacitive currents flowing from wire 230 to surrounding parts.

Throughout the foregoing discussions it has been assumed that oscillator 300 has been omitted. This oscillator may be employed if desired to broaden the spots in a horizontal direction. As can be seen from Figures 7 and 8 whenever a spot is produced on the screen the two adjacent spots in both horizontal directions are not illuminated. Hence, if a very high frequency oscillator 300 is in series with the horizontal scanning circuit, the spots scanned may be broadened in a horizontal direction. Further if desired oscillator 300 may be triggered by wire 301 fed by multiplier 101 so that the oscillations of 300 vary at dot frequency or some multiple thereof. As a result one may obtain scanning paths similar to those shown in Figures 12 and 13 if desired.

For the sake of simplicity it has been assumed in connection with the foregoing discussion that non-interlaced scanning was employed. As is well known interlaced scanning is desirable and it of course may be employed by following known principles. When employed, the vertical sweep generator should be arranged to descend so rapidly that dot 78 will appear two spaces below dot 66 instead of only one space, and the beam will be shifted vertically one space during alternate scans.

It is also understood that although I have shown a rotating color wheel 43 in the receiver that this is done for purposes of simplifying the explanation. In my prior copending applications S. N. 163,285, filed May 20, 1950, entitled Color Television, and S. N. 162,327, filed May 16, 1950, entitled Electro Optical Screens for Color Television, S. N. 188,557, filed October 5, 1950, entitled Color Television, S. N. 189,835, filed December 8, 1950, entitled Slit Screens, and S. N. 212,757, filed February 26, 1951, entitled Color Television Systems Hexagonal, I have shown how vibrating color screens may be employed and their use may be desirable depending on the circumstances.

This application is a continuation-in-part of my prior copending applications S. N. 163,285, filed May 20, 1950, entitled Color Television, and S. N. 232,075, filed June 18, 1951, entitled Television Systems.

In Figures 13 and 14, I have illustrated a modified form of color screen that is particularly suited for use in connection with my television system. It comprises a wheel 400 which has a window 409 or in the alternative the whole wheel 400 may be made of a thin transparent material. Positioned to the right of wheel 400 is a second wheel 401 which rotates synchronosuly with wheel 400. Wheel 400 is supported by four rotating wheels 402 which have a peripheral groove in which the outer edge of wheel 400 fits. Likewise wheel 401 is supported by wheels 403. Gearing may be used if desired to synchronize the two wheels. The cathode ray tube 408 is located behind the wheel 400 and the face of tube 408 is visible through the window 409 of wheel 400. A plurality of colored light filters some of which bear reference numbers 412 to 427, are pivoted at their left ends to wheel 400 and at their right hand ends to wheel 401. The colors of the filters are blue, red and green and there are a whole number of sets of filters of three filters each. For example there may be four sets of three filters as shown.

At any one time there are three filters in front of the screen progressing downward. For example blue filter 412 covers the horizontal "blue" line of dots 66, 69, 72 and 75 (see Figure 7), white red filter 413 covers the horizontal "red" line of dots 67, 70, 73 and 76 (see Figure 7), and the green filter 414 covers the horizontal "green" line of dots 68, 71, 74 and 77 of Figure 7.

As shown in Figure 15 the wheels 400 and 401 are spaced apart somewhat parallel to their axes of rotation so that the filters 412 to 427 are always at an acute angle to the planes of the wheels 400 and 401. Hence, the filters that are moving upward do not interfere with those moving downward.

If the filters are spaced one-third the height of the screen aparat and move downward at such a speed any one filter moves the total height of the screen in the same time that spot 66 of Figure 7 requires to move down the height of the screen.

The link 412 of Figure 16 has a metal frame 451 and a colored window 450. The metal frame 451 is colored black.

While as shown in the drawings there are only two wheels 400 and 401 it is understood that where the diameter of the screen is small and the diameter of the wheels is therefore small, two or three sets of wheels 400 and 401 may be employed. For example, a wheel exactly similar to wheel 400 may be mounted coaxial with wheel 400, with another wheel similar to wheel 401 coaxial with the latter. Three or prehaps six links may be used on the front set of wheels 400 and 401 and another set of three (or six links on the rear set of wheels). All wheels run in synchronism but the links on the two sets of wheels will be out of phase so it is the equivalent as though all of the links were on the front wheel. The number of sets of wheels 400 and 401 may be multiplied indefinitely thus giving any number of links desired.

I claim to have invented:

1. A television receiver comprising a cathode ray tube, means for deflecting the beam in the tube to illuminate spots in the first and every third succeeding vertical column along one horizontal line which moves downward at frame frequency, and in the second and every third succeeding vertical column along a second horizontal line that moves downward at frame frequency, and in the third and every third succeeding vertical column along a third horizontal line that moves downward at frame frequency, color filtering means for imparting the three primary colors respectively to the light emitted by the three horizontal lines and moving downward along with the three horizontal lines, three channels for signals representing the three primary colors, and means controlled by the received signals for controlling the intensity of the beam according to the signal in the channel complementary to the color of the filter that is imparting color to the spot being illuminated.

2. A television system comprising a cathode ray tube, means for deflecting the beam in the tube to successively illuminate spots in a plurality of vertical columns, said means including means for shifting the beam from one to another of a plurality of spaced horizontal lines following the illumination of each spot, color imparting means for imparting different colors to spots at different horizontal levels to thus impart different colors respectively to the light from said horizontal lines, means including a plurality of channels one for each different color of the color imparting means, and means controlling the intensity of the beam according to the signal in the channel complementary to the color imparted to the beam.

3. A television receiver comprising a cathode ray tube having first and second pairs of deflection plates, a ring of resistance material having an insulating spacer therein, means for applying opposite sides of a direct current potential to the resistance material on opposite sides of the spacer, a plurality of at least three brushes spaced around the ring, means for rotating the ring relative to the brushes whereby to produce sawtooth waves in the brushes, means for sequentially connecting the brushes to the first pair of deflection plates, means for applying a sawtooth wave to the other pair of deflection plates, receiver means for receiving a television signal and providing a plurality of channels of color video signals, there being one such channel for each brush and each channel having a signal representing a different color therein, means for controlling the intensity of the cathode ray tube controlled by the signals in said channels and shifting its input sequentially to the several channels in synchronism with the shifting of the energization of said first pair of deflection plates from brush to brush, color imparting means in front of the cathode ray tube for imparting different colors to the plurality of lines to which the beam is shifted when the first pair of deflection plates is shifted sequentially to the several brushes, and means for effectively moving the color imparting means across the face of the cathode ray tube in synchronism with the relative motion of the ring and brushes.

References Cited in the file of this patent

UNITED STATES PATENTS

| | | |
|---|---|---|
| 2,089,695 | Fyler | Aug. 10, 1937 |
| 2,159,105 | Reid | May 23, 1939 |
| 2,200,285 | Lorenzen | May 14, 1940 |
| 2,292,161 | Roosenstein | Aug. 4, 1942 |
| 2,457,415 | Sziklai | Dec. 28, 1948 |
| 2,478,598 | Somers | Aug. 9, 1949 |
| 2,538,071 | Young | Jan. 16, 1951 |
| 2,549,780 | Earp | Apr. 24, 1951 |
| 2,552,386 | Sziklai et al. | May 8, 1951 |
| 2,558,351 | Fredendall | June 26, 1951 |
| 2,586,482 | Rose | Feb. 19, 1952 |
| 2,600,463 | Bertein | June 17, 1952 |
| 2,602,854 | Bedford | July 8, 1952 |
| 2,606,962 | Valensi | Aug. 12, 1952 |
| 2,608,672 | Miller | Aug. 26, 1952 |